United States Patent
Yun

(10) Patent No.: US 8,659,267 B2
(45) Date of Patent: Feb. 25, 2014

(54) BATTERY PACK AND OVER-DISCHARGE PROTECTING METHOD THEREOF

(75) Inventor: Changyong Yun, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 410 days.

(21) Appl. No.: 12/710,282

(22) Filed: Feb. 22, 2010

(65) Prior Publication Data

US 2010/0214707 A1 Aug. 26, 2010

(30) Foreign Application Priority Data

Feb. 24, 2009 (KR) ........................ 10-2009-0015245

(51) Int. Cl.
*H02J 7/00* (2006.01)

(52) U.S. Cl.
USPC ........................... 320/134; 320/116; 320/120

(58) Field of Classification Search
USPC ........................................................ 320/134
See application file for complete search history.

(56) References Cited

U.S. PATENT DOCUMENTS

| | | | | |
|---|---|---|---|---|
| 3,676,770 | A * | 7/1972 | Sharaf et al. | 324/430 |
| 6,051,955 | A * | 4/2000 | Saeki et al. | 320/121 |
| 6,060,864 | A * | 5/2000 | Ito et al. | 320/136 |
| 7,079,003 | B2 * | 7/2006 | Furuta et al. | 337/184 |
| 7,463,009 | B2 * | 12/2008 | Chang et al. | 320/121 |
| 2005/0237028 | A1 * | 10/2005 | Denning | 320/134 |
| 2006/0076934 | A1 | 4/2006 | Ogata et al. | |
| 2006/0077603 | A1 | 4/2006 | Kim | |
| 2007/0159138 | A1 | 7/2007 | Furuuchi et al. | |
| 2007/0188148 | A1 * | 8/2007 | Kawasumi et al. | 320/134 |
| 2007/0280012 | A1 * | 12/2007 | Obayashi et al. | 365/200 |
| 2008/0048608 | A1 | 2/2008 | Lim et al. | |
| 2008/0106234 | A1 | 5/2008 | Yun | |
| 2009/0015208 | A1 * | 1/2009 | White et al. | 320/150 |
| 2009/0085521 | A1 * | 4/2009 | Kim | 320/134 |
| 2009/0305115 | A1 | 12/2009 | Funabashi et al. | |
| 2010/0117592 | A1 | 5/2010 | Lim et al. | |

FOREIGN PATENT DOCUMENTS

| | | |
|---|---|---|
| EP | 0 880 214 A2 | 11/1998 |
| EP | 0 913 698 A1 | 5/1999 |
| EP | 1 921 727 A2 | 5/2008 |
| JP | 58-112970 U | 8/1983 |

(Continued)

OTHER PUBLICATIONS

English machine translation of Japanese Publication No. JP 2000-102185, published Apr. 7, 2000, 12 pps.

(Continued)

*Primary Examiner* — Edward Tso
*Assistant Examiner* — Johali Torres Ruiz
(74) *Attorney, Agent, or Firm* — Christie, Parker & Hale, LLP

(57) ABSTRACT

A battery pack includes a first battery stack having a plurality of battery cells connected in series, a second battery stack having a plurality of battery cells connected in series and connected in parallel to the first battery stack, a controller for sensing voltages of the plurality of battery cells of the first battery stack and the plurality of battery cells of the second battery stack and for outputting a fuse blowing signal when at least one of the sensed voltages is lower than a first reference voltage, and a fuse blowing unit for electrically decoupling the first and second battery stacks from an output terminal of the battery pack in response to the fuse blowing signal from the controller. A fuse blowing signal is also sent to the fuse blowing unit when the at least one of the sensed voltages is higher than a second reference voltage.

15 Claims, 8 Drawing Sheets

(56) References Cited

FOREIGN PATENT DOCUMENTS

| | | |
|---|---|---|
| JP | 10-322915 A | 12/1998 |
| JP | 11-133123 | 5/1999 |
| JP | 2000-102185 | 4/2000 |
| JP | 2003-052133 | 2/2003 |
| JP | 2003-052133 A | 2/2003 |
| JP | 2004-127532 A | 4/2004 |
| JP | 2006-081390 A | 3/2006 |
| JP | 2006/109596 A | 4/2006 |
| JP | 2007-116853 A | 5/2007 |
| JP | 2007/215310 A | 8/2007 |
| JP | 2008-061306 A | 3/2008 |
| JP | 2008-117743 A | 5/2008 |
| KR | 10-2006-0044296 A | 5/2007 |
| KR | 10-2008-0015215 A | 2/2008 |
| KR | 10-2008-0017824 A | 2/2008 |
| KR | 10-2008-0067948 A | 7/2008 |

OTHER PUBLICATIONS

KIPO Notice of Allowance dated Jan. 27, 2011 issued in priority Korean patent application No. 10-2009-0015245, 5pps.
European Search Report dated May 3, 2010 issued in corresponding European application No. EP 10154515, listing the cited references in this IDS.
JPO Office Action dated Aug. 2, 2011 for JP Application No. 2009-215778 (2 pages).
Machine English Translation of JP 58-112970 U.
Machine English Translation of JP 2004-127532 A.
Machine English Translation of JP 2008-061306 A.

* cited by examiner

BATTERY PACK AND OVER-DISCHARGE PROTECTING METHOD THEREOF

CROSS-REFERENCE TO RELATED APPLICATION

This application claims priority to and the benefit of Korean Patent Application No. 10-2009-0015245, filed on Feb. 24, 2009, in the Korean Intellectual Property Office, the entire content of which is incorporated herein by reference.

BACKGROUND OF THE INVENTION

1. Field of the Invention

The present invention relates to a battery pack and a protection method thereof.

2. Description of the Related Art

In general, a battery pack includes a plurality of battery cells, a charging switch to prevent the battery cells from being overcharged, a discharging switch to prevent the battery cells from being over-discharged and a control unit to control the charging switch and the discharging switch.

The control unit senses voltages of the battery cells, so that it turns off the charging switch to stop charging if the battery cells are overcharged and the discharging switch to stop discharging if over-discharged.

If the battery pack is left alone for a long time, it continues to decrease in voltage due to a self-discharging phenomenon that discharges on its own by three to five percents each month, even though the discharging switch is turned on to stop discharging. For instance, in a lithium-ion battery cell or a lithium-polymer battery cell, the discharging switch is turned off to stop discharging if a voltage of the battery cell comes to approximately 2.0 to 3.0V. However, if the battery cell is left alone in such a state for a long time, the voltage of the battery cell may drop to approximately 0 to 1.0 V.

When the battery cell is discharged to approximately 0 to 1.0 V as described above, a copper used in forming a negative electrode collector may be melted. That is, the cooper is eluted from the negative electrode collector, so that a negative electrode and a positive electrode are electrically connected to or with each other, thereby causing a short circuit. Under this state, if the battery cell or/and pack begins to charge, a large amount of heat may be generated between the negative electrode and the positive electrode, which are short-circuited, and thus the battery cell and/or pack may explode or ignite.

SUMMARY OF THE INVENTION

Exemplary embodiments of the present invention provide a battery pack, which can automatically blow out a fuse when the battery pack is left in an over-discharged state for a long time or in an overcharged state, thereby preventing an accident from happening due to the battery pack exploding or igniting.

In accordance with an aspect of an embodiment of the present invention, a battery pack includes a first battery stack having a plurality of battery cells connected in series, and a second battery stack having a plurality of battery cells connected in series, and connected in parallel to the first battery stack. The battery pack further includes a controller for sensing voltages of the plurality of battery cells of the first battery stack and voltages of the plurality of battery cells of the second battery stack and for outputting a fuse blowing signal when at least one of the sensed voltages is lower than a first reference voltage. The battery pack also includes a fuse blowing unit for electrically decoupling the first and second battery stacks from an output terminal in response to the fuse blowing signal from the controller.

The control unit may output the fuse blowing signal when the at least one of the sensed voltages is lower than the reference voltage for a duration longer than a reference time.

The first battery stack and the second battery stack may have a same or substantially similar shape.

The first battery stack and the second battery stack may have different shapes.

The first battery stack and the second battery stack may have a substantially same capacity.

The first battery stack and the second battery stack may have different capacities.

The fuse blowing unit may include a fuse to electrically connect the first battery stack and the second battery stack to the output terminal, a heating resistance connected to the fuse to provide heat to the fuse, and a switch connected to the heating resistance to allow an electric current to flow into the heating resistance.

The fuse blowing unit may output a fuse blowing proceed signal to the controller when the first and second battery stacks and the output terminal are electrically decoupled.

The fuse blowing unit may further include a capacitor to filter electric noise.

The fuse blowing unit may further include a diode to prevent electric noise from flowing into the controller.

The battery pack may further include a first primary protection circuit between the first battery stack and the controller. The first primary protection circuit senses the voltages of the plurality of battery cells of the first battery stack and transmits the sensed voltages to the controller. The battery pack may also include first secondary protection circuit between the first battery stack and the fuse blowing unit. The first secondary protection circuit senses the voltages of the plurality of battery cells of the first battery stack and outputs a fuse blowing signal to the fuse blowing unit when at least one of the sensed voltages is higher than a second reference voltage.

The battery pack may further include a second primary protection circuit between the second battery stack and the controller. The second primary protection circuit senses the voltages of the plurality of battery cells of the second battery stack and transmits the sensed voltages to the controller. The battery pack may also include a second secondary protection circuit between the second battery stack and the fuse blowing unit. The second secondary protection circuit senses the voltages of the plurality of battery cells of the second battery stack and outputs a fuse blowing signal to the fuse blowing unit when at least one of the sensed voltages is higher than the second reference voltage.

In accordance with another aspect of an embodiment of the present invention, a method of over-discharge protection is provided for a battery pack including a first battery stack having a plurality of battery cells, and a second battery stack having a plurality of battery cells and connected in parallel to the first battery stack. The method includes determining a voltage of the first battery stack, determining a voltage of the second battery stack, and blowing out a fuse connected between the first and second battery stacks and an output terminal when the voltage of the first battery stack or the voltage of the second battery stack is lower than the reference voltage.

The determining the voltage of the first battery stack may include comparing voltages of the plurality of battery cells of the first battery stack the reference voltage to determine whether or not at least one voltage in the plurality of battery cells of the first battery stack is lower than the reference voltage.

The determining the voltage of the second battery may include comparing voltages of the plurality of battery cells of the second battery stack with the reference voltage to determine whether or not at least one voltage in the plurality of battery cells of the second battery stack is lower than the reference voltage.

The over-discharge protecting method may further include determining whether or not the voltage of the first battery stack is lower than the reference voltage for a duration longer than a reference time.

The over-discharge protecting method may further include determining whether or not the voltage of the second battery stack is lower than the reference voltage for a duration longer than a reference time.

As described above, the battery pack according to an embodiment of the present invention is configured such that if the battery pack is left in the over-discharged state for a long time or in an overcharged state for a long time, the fuse is blown out to prohibit a user from using the battery pack. That is, even though the battery pack is connected to a charger by the user, it is not charged. In other words, if the battery pack is over-discharged enough to elute a copper therefrom, the battery pack according to the present invention blows out the fuse, such that the battery pack is not charged even though it is connected to the charger. In addition, if the battery pack is overcharged beyond a reference voltage, the battery pack according to an embodiment of the present invention blows the fuse. Therefore, the battery pack is prevented from exploding or igniting, for example.

BRIEF DESCRIPTION OF THE DRAWINGS

The accompanying drawings, together with the specification, illustrate exemplary embodiments of the present invention, and, together with the description, serve to explain the principles of the present invention, in which.

DETAILED DESCRIPTION

Figure 1:
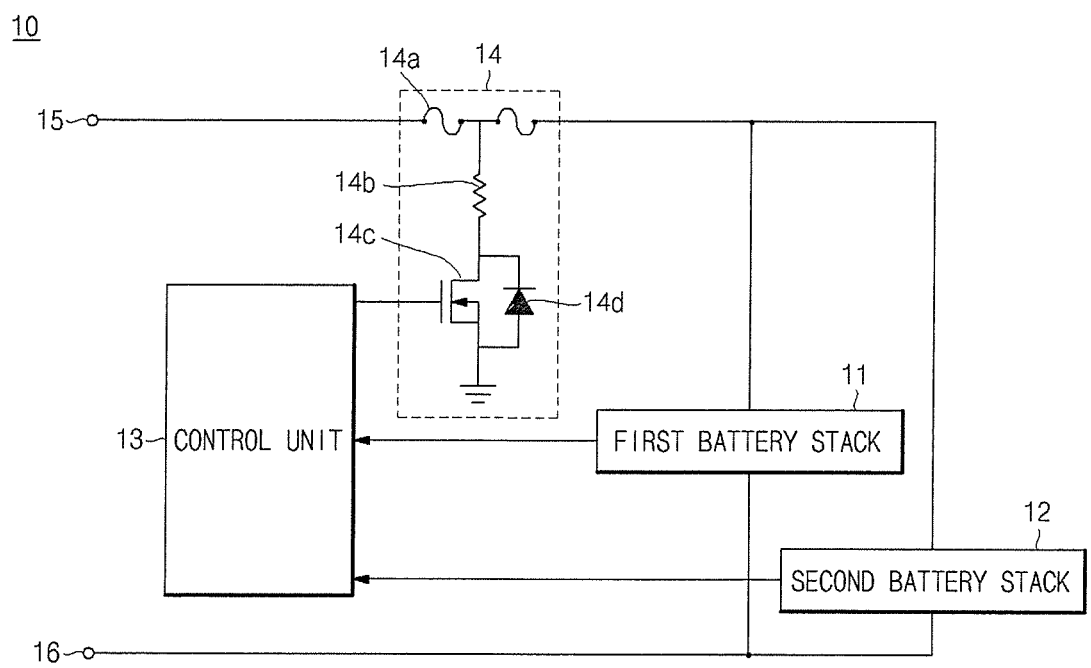
FIG. 1 is a schematic block diagram of a battery pack according to an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

FIG. 1 is a schematic block diagram of a battery pack according to an embodiment of the present invention.

As illustrated in FIG. 1, the battery pack 10 according to one embodiment of the present invention includes a first battery stack 11, a second battery stack 12, a control unit 13 (i.e., a controller), and a fuse blowing unit 14.

The first battery stack 11 includes a plurality of battery cells connected in series or in parallel.

The second battery stack 12 includes a plurality of battery cells connected in series or in parallel. In addition, the second battery stack 12 may be connected to the first battery stack 11. For example, the second battery stack 12 is connected to the first battery stack 11 in parallel.

Here, all of the battery cells constituting the first battery stack 11 may be lithium-ion batteries and all of the battery cells constituting the second battery stack 12 may be lithium-polymer batteries, and vice versa. Further, all of the battery cells constituting the first battery stack 11 may be cylinder-type batteries and all of the battery cells constituting the second battery stack 12 may be polygonal-type batteries, and vice versa.

Also, the first battery stack 11 and the second battery stack 12 may be the same or different in capacity, and/or types of batteries in the stack. For instance, the first battery stack 11 and the second battery stack 12 may have capacities of 1300 mAh and 1500 mAh, respectively.

As described above, the battery pack according to one embodiment of the present invention may be configured such that battery stacks of various kinds, shapes, or capacities are incorporated into a single battery pack, thereby improving or maximizing efficiency of using space in the battery pack.

The control unit 13 senses voltages of a plurality of battery cells of the first battery stack 11 and voltages of a plurality of battery cells of the second battery stack 12. In addition, the control unit 13 compares the sensed voltages with a first reference voltage to determine whether or not at least one of the sensed voltages is lower than the first reference voltage. With this, the control unit 13 determines whether or not the at least one of the sensed voltages is lower than the first reference voltage (e.g., predetermined reference voltage) for a duration longer than a reference time (e.g., predetermined reference time) When the control unit 13 determines from the above comparison that the at least one of the sensed voltages is lower than the first reference voltage for a duration longer than the reference time, it outputs a fuse blowing signal. Here, the control unit 13 may be a microcomputer with a conventional voltage sensing function and a conventional capacity calculating function, but the present invention is not limited thereto.

Also, the first reference voltage may be 1.0~2.0V. If the first reference voltage is above 2.0V, a problem of having to discard or scrap a still operational battery pack might arise, the first reference voltage is below 1.0V, a problem of insufficient operation voltage for the control unit 13 might arise. In addition, the reference time may be, for example, one second to sixty seconds. If the reference time is above sixty seconds, the battery pack 10 may be maintained in an unsafe condition for too long, and if the reference time is below one second, a problem of discarding or scrapping a non-dangerous battery pack might arise.

The fuse blowing unit 14 is connected between the first and the second battery stacks 11 and 12 and an output terminal 15. The fuse blowing unit 14 includes a fuse 14a, a heating resistance 14b, and a switch 14c controlled by the control unit 13. The fuse 14a is connected between the first and the second battery stacks 11 and 12 and the output terminal 15. The heating resistance 14b is connected to the middle of the fuse 14a. The switch 14c is connected to the heating resistance 14b. The switch 14c may be a general field effect transistor or bipolar transistor, and has a gate electrode (or a base electrode) connected to the control unit 13. In FIG. 1, a parasitic diode is identified as reference numeral 14d.

With the construction as described above, the control unit 13 outputs the fuse blowing signal to the fuse blowing unit 14 when at least one of the battery cells constituting the first battery stack 11 or at least one of the battery cells constituting the second battery stack 12 is discharged to have a voltage lower than the first reference voltage. When the switch 14c is turned on, the heating resistance 14b is heated, so that it blows out the fuse 14a (e.g., electrically decouples the first battery stack 11 and the second battery stack 12 from the output terminal). Thus, an electrical path between the first and the second battery stacks 11 and 12 and the output terminal 15 is permanently blocked (e.g., it is permanently disconnected). That is, even though the battery pack 10 is connected to a charger, it is not charged.

Here, the output terminal 15 may be a positive terminal connected to positive electrodes of the first and the second battery stacks 11 and 12. With this, another output terminal 16, which may be a negative terminal, is connected to negative electrodes of the first and the second battery stacks 11 and 12.

Figure 2A:
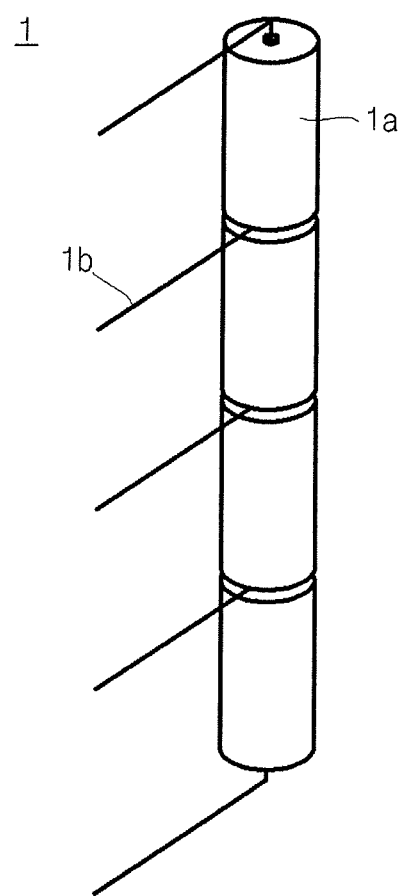
FIG. 2A is a perspective view of a cylinder-type battery stack according to an embodiment of the present invention.
Figure 2B:
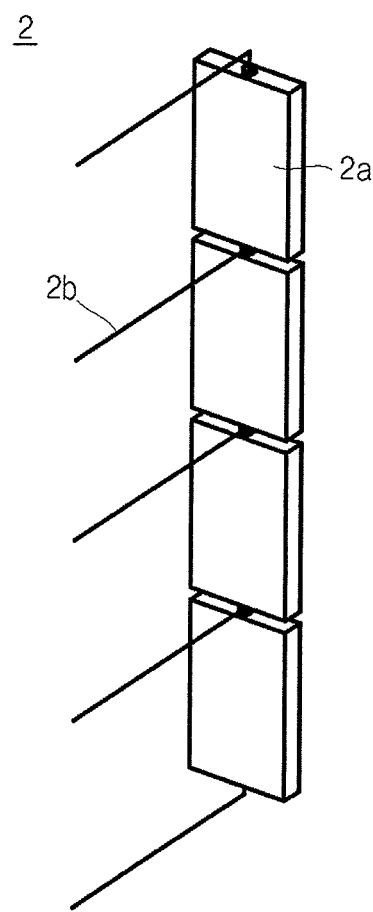
FIG. 2B is a perspective view of a polygonal-type battery stack according to another embodiment of the present invention.
Figure 2C:
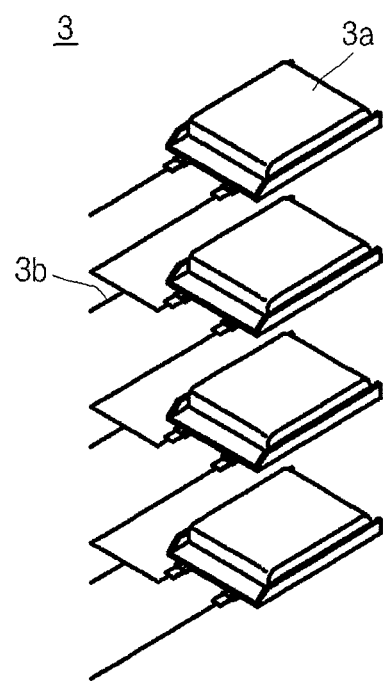
FIG. 2C is a perspective view of a polygonal-type battery stack according to another embodiment of the present invention.

FIG. 2A is a perspective view of a cylinder-type battery stack according to an embodiment of the present invention, and FIGS. 2B and 2C are perspective views of polygonal-type battery stacks according to other embodiments of the present invention.

As illustrated in FIG. 2A, a battery stack 1 may be formed of cylinder type battery cells 1a. Further, as illustrated in FIGS. 2B and 2C, battery stacks 2 and 3 may be formed of polygonal type battery cells 2a and 3a, respectively.

Also, each of the battery cells may be a lithium-ion battery or a lithium-polymer battery. For instance, all of the battery stacks 1 and 2 illustrated in FIGS. 2A and 2B are lithium-ion batteries and all of the battery stacks 3 illustrated in FIG. 2C are lithium polymer batteries. In FIGS. 2A-2C, reference numbers 1b, 2b and 3b are sensing wires to allow the control unit 13 to sense voltages from the battery cells.

Figure 3:
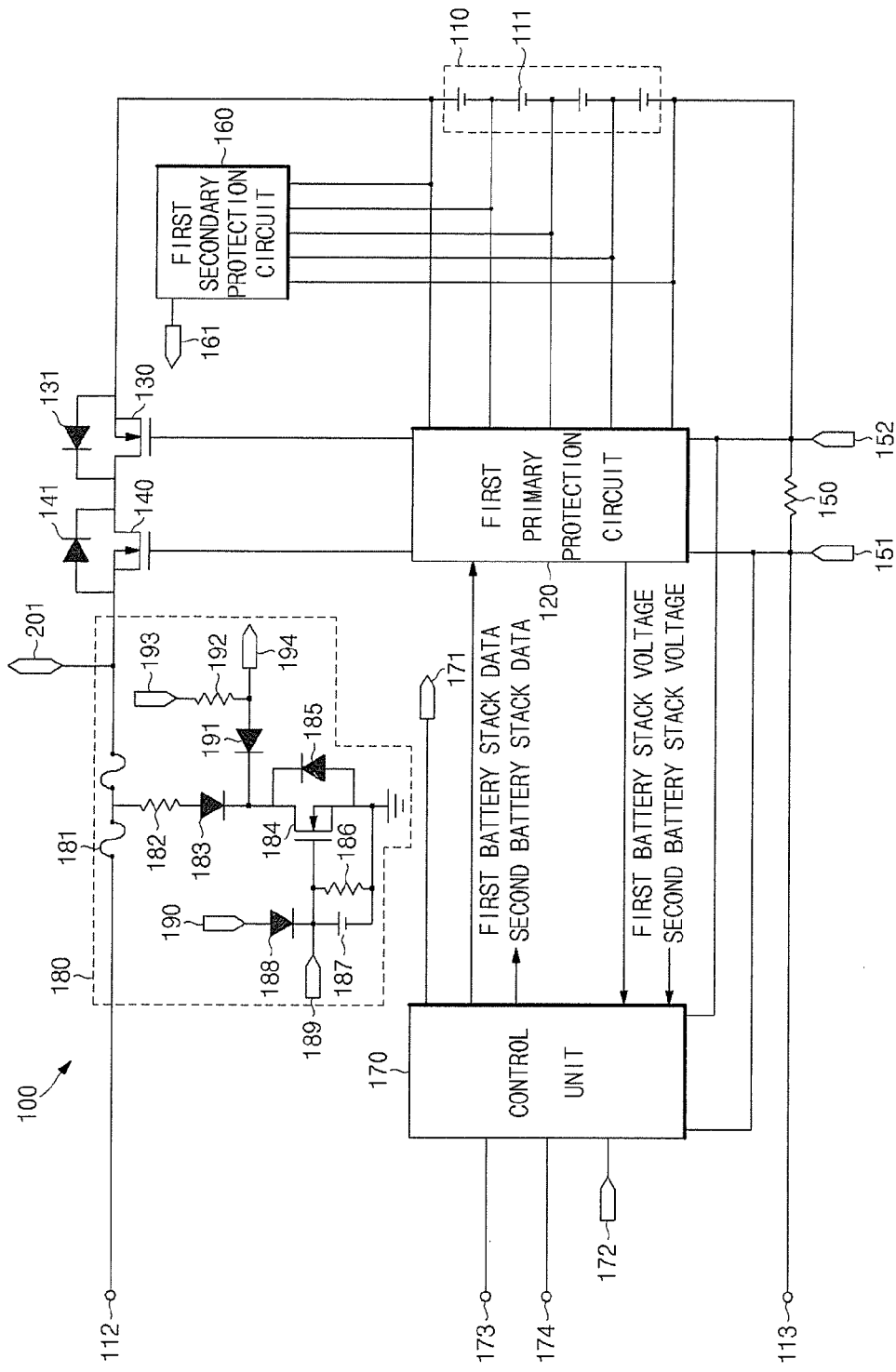
FIG. 3 is a block diagram of a first battery stack and a peripheral construction thereof in the battery pack of FIG. 1 according to an embodiment of the present invention.

FIG. 3 is a block diagram of the first battery stack and a peripheral construction thereof in the battery pack of FIG. 1 according to an embodiment of the present invention. Here, the first battery stack 110 and the peripheral construction thereof are defined as a first battery pack 100.

As illustrated in FIG. 3, the first battery pack 100 includes a first battery stack 110, a first primary protection circuit 120, a first charging switch 130, a first discharging switch 140, a current sensor 150, a first secondary protection circuit 160, a control unit 170 (i.e., a controller) and a fuse blowing unit 180.

The first battery stack 110 may have a plurality of battery cells 111 connected in series. Here, since a construction of the first battery stack 110 has been explained above, a detailed description thereof will be omitted.

The first primary protection circuit 120 is connected to a plurality of battery cells 111 constituting the first battery stack 110 to sense respective analog voltages therefrom. The first primary protection circuit 120 converts the sensed analog voltages into digital signals and outputs the converted digital signals to the control unit 170. The first primary protection circuit 120 may be either a conventional analog front end or an equivalent thereof, but the present invention is not limited thereto.

The first charging switch 130 is electrically connected between the first battery stack 110 and a positive output terminal 112. Such a charging switch 130 may be an insulated gate bipolar transistor (IGBT) or a Metal-Oxide-Semiconductor (MOS)-type field effect transistor having a parasitic diode 131, but the present invention is not limited thereto. The first primary protection circuit 120 turns off the first charging switch 130 when at least one voltage of the plurality of battery cells 111 forming the first battery stack 110 exceeds a second reference voltage, for example, 3.9~4.4V. Accordingly, the first battery stack 110 stops charging. However, discharging the first battery stack 110 through the parasitic diode 131 is possible.

The first discharging switch 140 is electrically connected between the first battery stack 110 and the positive output terminal 112. The first discharging switch 140 may be an IGBT or a MOS-type field effect transistor having a parasitic diode 141, but the present invention is not limited thereto. The first primary protection circuit 120 turns off the first discharging switch 140 when the at least one voltage of the plurality of battery cells 111 forming the first battery stack 110 is less than a third reference voltage, for example, 2.0~3.0V. Accordingly, the first battery stack 110 stops discharging. However, charging the first battery stack 110 through the parasitic diode 141 is possible.

Here, the first charging switch 130 and the first discharging switch 140 are connected in series to each other, and respective gates thereof are electrically connected to the first primary protection circuit 120.

The current sensor 150 is electrically connected between the first battery stack 110 and a negative output terminal 113. Further, the current sensor 150 at both ends thereof is electrically connected to the first primary protection circuit 120. Also, both ends of the current sensor 150 are electrically connected to the control unit 170. The current sensor 150 senses a charging current or a discharging current of the first battery stack 110 to inform the first primary protection circuit 120 or the control unit 170. In practice, the current sensor 150 provides voltage information to the first primary protection circuit 120 and the control unit 170. Since the first primary protection circuit 120 and the control unit 170 have data on a value of resistance of the current sensor 150, they can calculate a value of electric current by using the voltage information from the current sensor 150. Terminals 151 and 152 are connected to the ends of the current sensor 150, respectively. A second battery pack is electrically connected to the terminals 151 and 152. Accordingly, the current sensor 150 also senses an electric current of the second battery pack.

The first secondary protection circuit 160 is connected to the plurality of battery cells 111 constituting the first battery stack 110 to sense respective voltages therefrom. The first secondary protection circuit 160 outputs a fuse blowing signal to the fuse blowing unit 180 through a terminal 161 if at least one of the sensed voltages is an overcharge voltage that exceeds a reference voltage, for example, the second reference voltage (3.9~4.4V), for a duration exceeding a reference time, for example, 1~60 seconds. Here, the terminal 161 is electrically connected to a terminal 189 of the fuse blowing unit 180. On the other hand, the first secondary protection circuit 160 does not output the fuse blowing signal if the sensed voltages are less than a reference voltage, for example, the third reference voltage (2.0~3.0V), because the first secondary protection circuit 160 is not provided with a circuit for that purpose.

The control unit 170 is electrically connected to the first primary protection circuit 120. Further, the control unit 170 receives voltage information of the first battery stack 110 from the first primary protection circuit 120. With this, the control unit 170 receives voltage information of a second battery stack forming the second battery pack, which will be described below. Furthermore, the control unit 170 transmits first battery stack data, such as a charge stopping signal or a discharge stopping signal, to the first primary protection circuit 120. With this, the control unit 170 transmits second battery stack data, such as a charge stopping signal or a discharge stopping signal, to the second battery pack. Also, the control unit 170 includes a clock terminal 173 and a data terminal 174 for communicating with an external device, such as a mobile phone, a notebook, and a motor-operated tool.

The control unit 170 outputs first battery stack data for turning off the first charging switch 130 to the first primary protection circuit 120 when it determines that a voltage received from the first primary protection circuit 120 of the first battery pack 100 is an overcharge voltage, for example, 3.9~4.4V. In addition, the control unit 170 outputs second battery stack data for turning off a second charging switch to a second primary protection circuit of the second battery pack when it determines that a voltage received from the second primary protection circuit of the second battery pack is the overcharge voltage, that is, 3.9~4.4V.

Also, the control unit 170 outputs first battery stack data for turning off the first discharging switch 140 to the first primary protection circuit 120 when it decides that the voltage received from the first primary protection circuit 120 of the first battery pack 100 is an over-discharge voltage, for example, 2.0~3.0V. Further, the control unit 170 outputs second battery stack data for turning off a second discharging switch to the second primary protection circuit of the second battery pack when it determines that the voltage received from the second primary protection circuit of the second battery pack is the over-discharge voltage, that is, 2.0~3.0V.

Moreover, the control unit 170 outputs a fuse blowing signal through a terminal 171 when it determines that the voltage received from the first primary protection circuit 120 of the first battery pack 100 is less than a reference voltage, for example, the first reference voltage (about 1.0~2.0V), for a duration longer than a reference time, for example, 1~60 seconds. The terminal 171 is electrically connected with a terminal 190 of the fuse blowing unit 180. In addition, the control unit 170 receives a fuse blowing-proceed signal through a terminal 172. The terminal 172 is electrically connected with a terminal 194 of the fuse blowing unit 180. When the control unit 170 receives the fuse blowing-proceed signal, it recognizes and stores information that the fuse is blowing out.

The control unit 170 may be a microcomputer or an equivalent thereof, but the present invention is not limited thereto.

The fuse blowing unit 180 includes a fuse 181, a heating resistance 182, diodes 183 and 188, a switch 184, resistances 186 and 192, a capacitor 187, and terminals 189, 190, 193 and 194.

Here, the fuse 181 is connected between the first battery stack 110 and the positive output terminal 112, so that a charging current flows to the first battery stack 110 from the positive output terminal 112 or a discharging current flows to the positive output terminal 112 from the first battery stack 110. The heating resistance 182 is connected to the fuse 181, and is heated to a temperature of about 50.about.300.degree. C. to blow out the fuse 181. The diode 183 is connected to the heating resistance 182 and directs flow of the electric current to ground. The switch 184 is connected to the diode 183 and may be a field effect transistor with a parasite diode 185. The switch 184 may be turned on by an electrical signal from the first secondary protection circuit 160 or the control unit 170. The resistance 186 is connected between a gate and a source of the switch 184, so that it applies a voltage greater than a reference voltage to the gate of the switch 184. The capacitor 187 is connected between the gate and the source of the switch 184, and functions to charge a voltage. The capacitor 187 also functions to absorb and remove an electric noise (e.g., filters an electric noise). The diode 188 is connected between the terminal 190 and the capacitor 187 so as to prevent flow of electric current into the control unit 170. The terminal 189 is electrically connected to a terminal 161 provided on the first secondary protection circuit 160 to receive a fuse blowing signal therefrom. Further, the terminal 190 is electrically connected to a terminal 171 provided on the control unit 170 to receive a fuse blowing signal therefrom. The diode 191 is connected between the terminal 194 and the switch 184 so that the electric current flows only in one direction, and the resistance 192 is connected between the diode 191 and the terminal 193 so that it applies a voltage to the diode 191. The terminal 193 applies a voltage to the resistance 192. The terminal 194 outputs a fuse blowing-proceed signal to the control unit 170. The terminal 194 is electrically connected with a terminal 172 of the control unit 170.

A terminal 201 is further provided between the fuse 181 and the first discharging switch 140. The second battery pack is electrically connected to the terminal 201. A positive output terminal in the second battery pack is electrically connected to the terminal 201.

Figure 4:
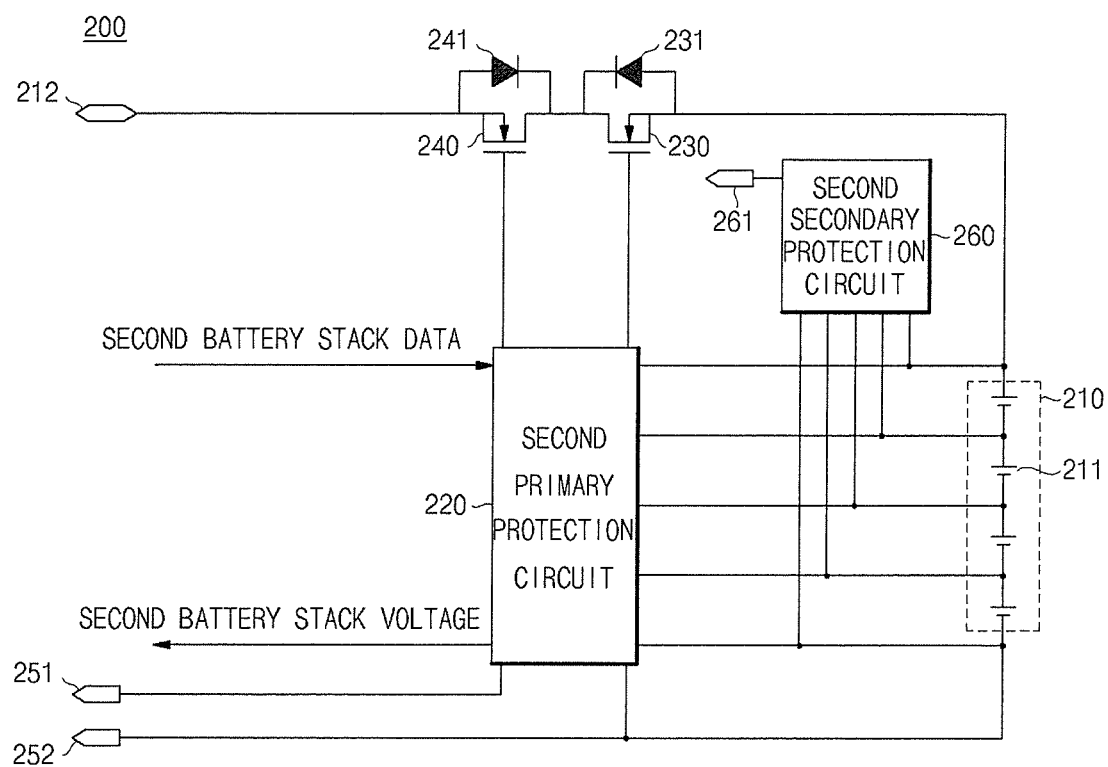
FIG. 4 is a block diagram of a second battery stack and a peripheral construction thereof in the battery pack of FIG. 1 according to an embodiment of the present invention.

FIG. 4 is a block diagram of the second battery stack and a peripheral construction thereof in the battery pack of FIG. 1 according to an embodiment of the present invention. Here, the second battery stack 210 and the peripheral construction thereof are defined as a second battery pack 200.

As illustrated in FIG. 4, the second battery pack 200 includes a second battery stack 210, a second primary protection circuit 220, a second charging switch 230, a second discharging switch 240, and a second secondary protection circuit 260. To facilitate understanding embodiments of the present invention, FIG. 2 will also be referred to.

The second battery stack 210 may have a plurality of battery cells 211 connected in series.

The second primary protection circuit 220 is connected to a plurality of battery cells 211 constituting the second battery stack 210 to sense respective analog voltages therefrom. The second primary protection circuit 220 converts the sensed analog voltages into digital signals and outputs the converted digital signals to the control unit 170. Here, the second primary protection circuit 220 is connected to terminals 151 and 152 provided in the first battery pack 100 through terminals 251 and 252. A negative electrode of the second battery stack 210 is connected to the terminal 252. Accordingly, an electric current of the second battery stack 210 is sensed by the control unit 170 as well as the second primary protection circuit 220.

Here, the second primary protection circuit 220 may be either a conventional analog front end or an equivalent thereof, but the present invention is not limited thereto.

The second charging switch 230 is electrically connected between the second battery stack 210 and a positive output terminal 212. Here, the positive output terminal 212 is electrically connected with the terminal 201 provided in the first battery pack 100, as described above. The second charging switch 230 may be an IGBT or a MOS-type field effect transistor having a parasitic diode 231, but the present invention is not limited thereto. The second primary protection circuit 220 turns off the second charging switch 230 when at least one voltage of the plurality of battery cells 211 forming the second battery stack 210 exceeds a reference voltage, for example, the second reference voltage (3.9~4.4V). Accordingly, the second battery stack 210 stops charging. However, discharging the second battery stack 210 through the parasitic diode 231 is possible. Of course, a control signal (second battery stack data) for discharging the second battery stack 210 is received from the control unit 170.

The second discharging switch 240 is electrically connected between the second battery stack 210 and the positive output terminal 212. The second discharging switch 240 may be an IGBT or a MOS type field effect transistor having a parasitic diode 241, but the present invention is not limited thereto. The second primary protection circuit 220 turns off the second discharging switch 240 when at least one voltage of the plurality of battery cells 211 forming the second battery stack 210 is less than a reference voltage, for example, the third reference voltage (2.0~3.0V). Accordingly, the second battery stack 210 stops discharging. However, charging the second battery stack 210 through the parasitic diode 241 is possible. Of course, a control signal (second battery stack data) for discharging the second battery stack 210 is received from the control unit 170.

Here, the second charging switch 230 and the second discharging switch 240 are connected in series to each other, and respective gates thereof are electrically connected to the second primary protection circuit 220.

The second secondary protection circuit 260 is connected to a plurality of battery cells 211 constituting the second battery stack 210 to sense respective charging voltages therefrom. The second secondary protection circuit 260 outputs a fuse blowing signal to the fuse blowing unit 180 through a terminal 261 if the sensed charging voltages exceed a reference voltage, for example, the second reference voltage (3.9~4.4V) to be at an overcharge voltage for a duration exceeding a reference time, for example, 1~60 seconds. The terminal 261 is electrically connected to the terminal 189 of the fuse blowing unit 180.

However, the second secondary protection circuit 260 does not output the fuse blowing signal if the sensed voltages are less than a reference voltage, for example, the third reference voltage (2.0~3.0V), because the second secondary protection circuit 260 is not provided with a circuit for that purpose.

As described above, the battery pack according to an embodiment of the present invention is configured such that the first battery stack 110 of the first battery pack 100 and the second battery stack 210 of the second battery pack 200 are connected in series to each other.

When the voltage of the first battery stack 110 in the first battery pack 100 is less than the first reference voltage (approximately 1.0~2.0V) or the voltage of the second battery stack 210 in the second battery pack 200 is less than the first reference voltage (approximately 1.0~2.0V), the control unit 170 operates the fuse blowing unit 180. Accordingly, the battery pack is disabled from use. That is, the fuse blowing unit 180 is operated to stop the battery pack from operating, that is, charging when the voltage of at least one of the first battery stack 110 and the second battery stack 210 is less than about 1.0~2.0V. Of course, when the duration during which the voltage of the first or/and the second battery stack 110 and/or 210 is less than about 1.0~2.0V exceeds the reference time (1~60 seconds), the control unit 170 stops operating, that is, charging, as described above.

Naturally, when the first battery pack 100 is in the overcharge voltage state for greater than the reference time, the fuse blowing unit 180 is operated by the first secondary protection circuit 160. Also, when the second battery pack 200 is in the overcharge voltage state for a duration greater than the reference time, the fuse blowing unit 180 is operated by the second secondary protection circuit 260.

That is, when the first battery pack 100 and the second battery pack 200 are in the overcharge voltage state (for example, more than 3.8~4.4V) for a duration greater than the reference time, the respective secondary protection circuits 160 and 260 operate the fuse blowing unit 180. However, when the first battery pack 100 and the second battery pack 200 are in the over-discharge voltage state (for example, less than 1.0~2.0V) for a duration greater than the reference time, the control unit 170 operates the fuse blowing unit 180.

The fuse blowing unit 180 begins to operate when a signal of high level is inputted through the terminal 161 or 261 by the first and the second secondary protection circuits 160 and 260 or a signal of high level is inputted through the terminal 171 by the control unit 170.

When the electric signal of high level is applied through either the terminal 189 or the terminal 190, a high voltage is applied to the gate of the switch 184, so that the switch 184 is turned on. Then, an electric current from a charger connected to the battery stack 110, the second battery stack 184, or the positive output terminal 112 flows through the heating resistance 182 and the switch 184. Here, since the discharging switch 140 or 240 is in a turned-off state if in a normal condition, the electric current from the charger flows through the heating resistance 182.

As a result, the fuse 181 is blown out by heat generated from the heating resistance 182. Thus, the first battery stack 110 or the second battery stack 210 stops operating, that is, charging or discharging. Of course, the battery pack in which the fuse 181 is blown out cannot be used again, so that specific battery pack is discarded.

Meanwhile, when the switch 184 is turned on, a fuse blowing-proceed signal is inputted into the terminal 172 of the control unit 170 through the terminal 192. Accordingly, the control unit 170 receives the fuse blowing-proceed signal and recognizes and records that the switch 184 is normally working now.

Hereinafter, an over-discharge protecting method, which may be performed mainly by the control unit in the battery pack constructed as described above, will be described with reference to FIG. 5 along with FIGS. 3 and 4.

Figure 5:
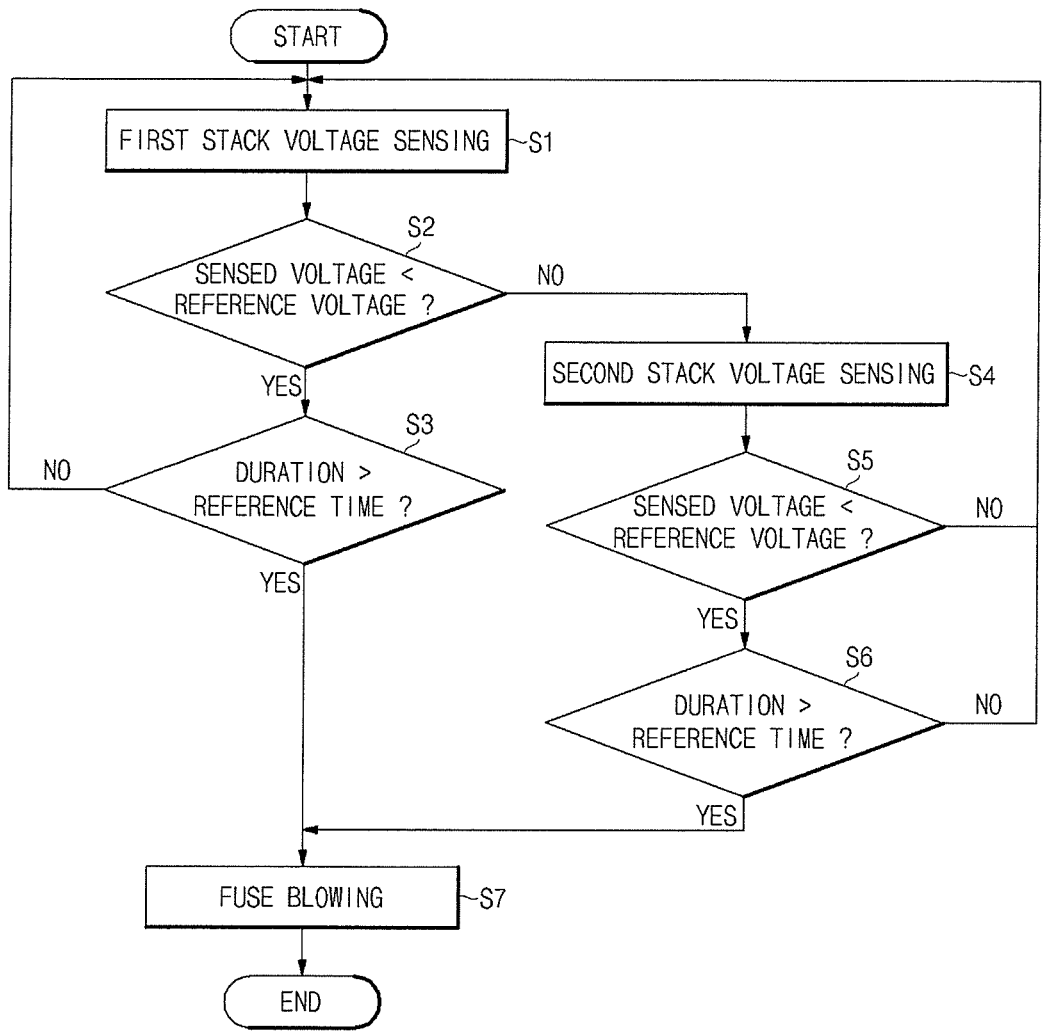
FIG. 5 is a flow chart of an over-discharge protection method of the battery pack of FIG. 1 according to an embodiment of the present invention.

FIG. 5 is a flow chart of an over-discharge protection method of the battery pack of FIG. 1 according to an embodiment of the present invention.

As illustrated in FIG. 5, the over-discharge protecting method of the battery pack according to one embodiment of the present invention includes a first battery stack voltage sensing step S1, a first battery stack voltage comparing step S2, a first battery stack voltage-duration comparing step S3, a second battery stack voltage sensing step S4, a second battery stack voltage comparing step S5, a second battery stack voltage-duration comparing step S6, and a fuse blowing step S7.

The first battery stack voltage sensing step S1 includes sensing a voltage of the first battery stack 110. That is, the control unit 170 senses respective voltages (i.e. each voltage) of the plurality of first battery cells 111 forming the first battery stack 110 in the first battery pack 100 by using the first primary protection circuit 120.

The first battery stack voltage comparing step S2 includes comparing the sensed voltage of the first battery stack 110 with a reference voltage, for example, the first reference voltage (1.0~2.0V), to determine whether the sensed voltage of the first battery stack 110 is lower than the reference voltage. In other words, the control unit 170 compares the respective sensed voltages of the plurality of first battery cells 111 with the first reference voltage, that is, 1.0~2.0V.

In step S2, if the control unit 170 determines that the sensed voltage of at least one of the battery cells 111 of the first battery stack 110 is lower than the first reference voltage (1.0~2.0V), it performs the following step S3. That is, if the control unit 170 determines that at least one of the sensed voltages of the plurality of first battery cells 111 is lower than the first reference voltage (1.0~2.0V), it performs the following step S3.

The first battery stack voltage-duration comparing step S3 includes determining whether or not the sensed voltage of the first battery stack 110 is lower than the first reference voltage for a time longer than the reference time, for example, 1~60 seconds.

In step S3, if the control unit 170 determines that the sensed voltage is lower than the first reference voltage for a time longer than the reference time, it performs the following step S7.

Meanwhile, in step S2, when the control unit 170 determines that each of the sensed voltages of the first battery stack 110 is greater than the first reference voltage (1.0~2.0V), it performs the following step S4.

The second battery stack voltage sensing step S4 includes sensing a voltage of the second battery stack 210. That is, the control unit 170 senses voltages of the plurality of second battery cells 211 of the second battery stack 210 in the second battery pack 200 with the second primary protection circuit 220.

The second battery stack voltage comparing step S5 includes comparing the sensed voltage of the second battery stack 210 with a reference voltage, for example, the first reference voltage (1.0~2.0V) to determine whether the sensed voltage of the second battery stack 210 is lower than the first reference voltage. In other words, the control unit 170 compares the respective sensed voltages of the plurality of second battery cells 211 with the first reference voltage (1.0~2.0V).

In step S5, if the control unit 170 determines that the sensed voltage of at least one of the second battery cells 211 of the second battery stack 210 is lower than the first reference voltage (1.0~2.0V), it performs the following step S6. That is, if the control unit 170 decides that at least one of the sensed voltages of the plurality of second battery cells 211 is lower than the first reference voltage (1.0~2.0V), it performs the following step S6.

The second battery stack voltage-duration comparing step S6 includes determining whether or not the sensed voltage of the second battery stack 110 is lower than the first reference voltage for a time greater than a reference time, for example, 1~60 seconds.

In step S6, if the control unit 170 determines that the sensed voltage is lower than the first reference voltage for a time greater than the reference time, it performs the following step S7.

The fuse blowing step S7 includes outputting a fuse blowing signal to the fuse blowing unit 180 formed on a high-current path of the first and the second battery packs 100 and 200 to block or cut off the high-current path.

In other words, the control unit 170 outputs an electric signal of high level to the switch 184 of the fuse blowing unit 180. Then, the switch 184 is turned on, so that an electric current flows through the fuse 181, the heating resistance 182 and the switch 184. Here, the electric current may be an electric current from the first battery stack 110, the second battery stack 210 or the charger. Accordingly, the heating resistance 182 is heated, and the fuse 182 is blown out. Meanwhile, when the switch 184 is turned on as described above, the fuse blowing unit 180 transmits a fuse blowing-proceed signal for reporting a turned-on condition of the switch 184, to the control unit 170 through the terminal 172.

Figure 6A:
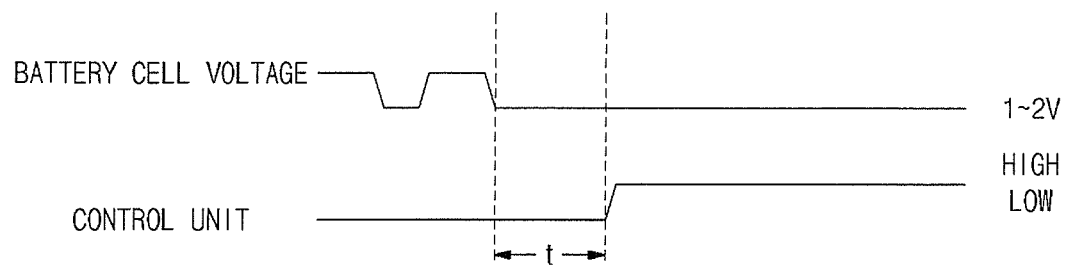
FIG. 6A is a timing chart of an over-discharge protection operation, which is performed by a control unit in the battery pack of FIG. 1 according to an embodiment of the present invention.
Figure 6B:
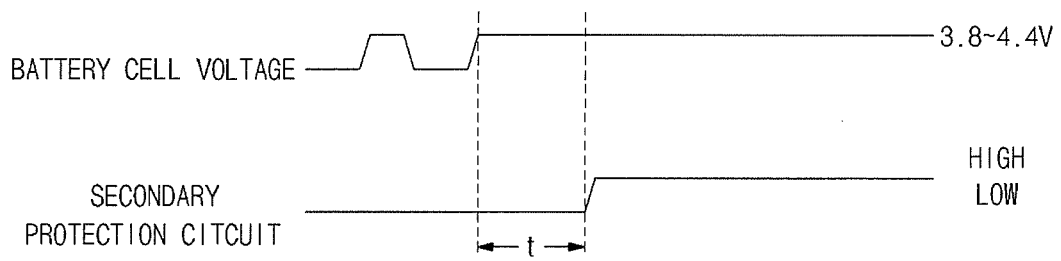
FIG. 6B is a timing chart of an overcharge protection operation, which is performed by secondary protection circuits in the battery pack of FIG. 1 according to an embodiment of the present invention.

FIG. 6A is a timing chart of an over-discharge protection operation, which is performed by the control unit in the battery pack of FIG. 1 according to an embodiment of the present invention, and FIG. 6B is a timing chart of an over-charge protection operation, which is performed by the second protection circuit in the battery pack of FIG. 1 according to an embodiment of the present invention.

As illustrated in FIG. 6A, the control unit 170 does not output an electric signal of high level to the fuse blowing unit 180 until an over-discharge voltage, for example, 1.0~2.0V, is present for a duration greater than a reference time t, for example, 1~60 seconds. That is, the control unit 170 does not operate the fuse blowing unit 180 when the over-discharge voltage is present for a time shorter than the reference time.

As illustrated in FIG. 6B, the first or the second secondary protection circuit 160 or 260 provided in the first battery pack 100 or the second battery pack 200 does not output an electric signal of high level to the fuse blowing unit 180 until an overcharge voltage, for example, 3.8~4.4V is present for a duration greater than a reference time t, for example, 1~60 seconds. That is, the first and second secondary protection circuits 160 and 260 do not operate the fuse blowing unit 180 when the overcharge voltage is present for a time shorter than the reference time.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a first battery stack comprising a plurality of battery cells coupled in series;
   a second battery stack comprising a plurality of battery cells coupled in series, and coupled in parallel with the first battery stack;
   a controller for sensing voltages of the plurality of battery cells of the first battery stack and voltages of the plurality of battery cells of the second battery stack and for outputting a fuse blowing signal when at least one of the sensed voltages is lower than a first reference voltage; and
   a fuse blowing unit for electrically decoupling the first battery stack and the second battery stack from an output terminal of the battery pack in response to the fuse blowing signal from the controller, the fuse blowing unit comprising:
      a fuse between the first and second battery stacks and the output terminal;
      a heating resistance coupled to the fuse to provide heat to the fuse;
      a switch coupled to the heating resistance to allow a first electric current to flow into the heating resistance; and a fuse blowing-proceed resistance coupled to the switch,
wherein the fuse blowing unit is configured to output a fuse blowing-proceed signal to the controller as a result of a second electric current flowing through the fuse blowing-proceed resistance when the first electric current flows into the heating resistance, and
wherein at least a portion of the second current flows through the switch.

2. The battery pack of claim 1, wherein the controller outputs the fuse blowing signal when the at least one of the sensed voltages is lower than the first reference voltage for a duration longer than a reference time.

3. The battery pack of claim 1, wherein the first battery stack and the second battery stack have substantially a same shape.

4. The battery pack of claim 1, wherein the first battery stack and the second battery stack have different shapes.

5. The battery pack of claim 1, wherein the first battery stack and the second battery stack have substantially a same capacity.

6. The battery pack of claim 1, wherein the first battery stack and the second battery stack have different capacities.

7. The battery pack of claim 1, wherein the fuse blowing unit further comprises a capacitor to filter an electric noise.

8. The battery pack of claim 1, wherein the fuse blowing unit further comprises a diode to prevent an electric noise from flowing into the controller.

9. The battery pack of claim 1, further comprising:
a first primary protection circuit between the first battery stack and the controller, for sensing the voltages of the plurality of battery cells of the first battery stack and for transmitting the sensed voltages to the controller; and
a first secondary protection circuit between the first battery stack and the fuse blowing unit, for sensing the voltages of the plurality of battery cells of the first battery stack and for outputting a secondary fuse blowing signal to the fuse blowing unit when at least one of the sensed voltages is higher than a second reference voltage.

10. The battery pack of claim 1, further comprising:
a second primary protection circuit between the second battery stack and the controller, for sensing the voltages of the plurality of battery cells of the second battery stack and for transmitting the sensed voltages to the controller; and
a second secondary protection circuit between the second battery stack and the fuse blowing unit, for sensing the voltages of the plurality of battery cells of the second battery stack and for outputting a secondary fuse blowing signal to the fuse blowing unit when at least one of the sensed voltages is higher than a second reference voltage.

11. A method of over-discharge protection of a battery pack, the battery pack comprising a first battery stack comprising a plurality of battery cells, and a second battery stack comprising a plurality of battery cells and coupled in parallel to the first battery stack, the method comprising:
determining a voltage of the first battery stack;
determining a voltage of the second battery stack;
blowing out a fuse between the first and second battery stacks and an output terminal of the battery pack when the voltage of the first battery stack or the voltage of the second battery stack is lower than a reference voltage by delivering a fuse blowing signal to a switch to cause a first current to travel through the fuse; and
outputting a fuse blowing-proceed signal when a second current flows through a fuse blowing-proceed resistance as a result of the switch being turned on,
wherein at least a portion of the second current flows through the switch.

12. The method of claim 11, wherein the determining the voltage of the first battery stack comprises comparing voltages of the plurality of battery cells of the first battery stack with the reference voltage to determine whether or not at least one of the voltages of the plurality of battery cells of the first battery stack is lower than the reference voltage.

13. The method of claim 11, wherein the determining the voltage of the second battery stack comprises comparing voltages of the plurality of battery cells of the second battery stack with the reference voltage to determine whether or not at least one of the voltages in the plurality of battery cells of the secondary battery stack is lower than the reference voltage.

14. The method of claim 11, further comprising:
determining whether or not the voltage of the first battery stack is lower than the reference voltage for a duration longer than a reference time.

15. The method of claim 11, further comprising:
determining whether or not the voltage of the second battery stack is lower than the reference voltage for a duration longer than a reference time.

* * * * *